United States Patent [19]

Hed

[11] Patent Number: 4,975,265
[45] Date of Patent: Dec. 4, 1990

[54] "DELTA SINGLET OXYGEN" CONTINUOUS REACTOR

[75] Inventor: Aharon Z. Hed, Nashua, N.H.

[73] Assignee: International Superconductor Corp., Riverdale, N.Y.

[21] Appl. No.: 288,403

[22] Filed: Dec. 21, 1988

[51] Int. Cl.⁵ .............................................. C01B 13/00
[52] U.S. Cl. .................................... 423/579; 422/129; 505/1
[58] Field of Search ......................................... 423/579

[56] References Cited

U.S. PATENT DOCUMENTS 4,310,502  1/1982  Wagner ................................. 422/120
4,342,116  7/1982  Macknight et al. ................. 422/120
4,461,756  7/1984  Rockenfeller ....................... 422/189
4,668,498  5/1987  Davis .................................. 422/128

Primary Examiner—John Doll
Assistant Examiner—Wayne A. Langel
Attorney, Agent, or Firm—Herbert Dubno

[57] ABSTRACT

A reactor capable of continuously producing activated species of oxygen molecules, specifically those known as "Delta Singlet Oxygen". Uses of "Delta Singlet Oxygen" include the maintenance of high oxidation potential during the deposition of layers of high temperature superconductors. Delta singlet oxygen is particularly effective in obtaining ultra-smooth surfaces when used as the etching gas in plasma milling of a diamond-like carbon film. The film can be used as an ideal insulating barrier for construction of high-temperature superconducting Josephson junctions.

7 Claims, 2 Drawing Sheets

"DELTA SINGLET OXYGEN" CONTINUOUS REACTOR

CROSS REFERENCE TO RELATED APPLICATION

This application is related to my commonly assigned concurrently filed copending application Ser. No. 07/290,178 filed Dec. 23, 1988 which discloses a method of and an apparatus for producing the delta singlet oxygen which is here used to reduce the thickness of the deposited diamond-like carbon layer and also may be used during the deposition of the superconductor layers.

FIELD OF THE INVENTION

My present invention relates to a method of and an apparatus for producing delta singlet oxygen.

BACKGROUND OF THE INVENTION

For some time, a unique excited state of the oxygen molecule has been known to have a relatively long half life. The excitation energy of this species is approximately 1 electron volt, and the half life about 40 minutes. This species has been used as an energy source for Iodine/Oxygen chemical lasers. This species is known in the prior art as "Delta Singlet Oxygen" (see for instance "Chemically Pumped Iodine Laser", by R. J. Richardson and C. E. Wiswall, Appl. Phys. Lett. 35(2), July 1979).

In a pending application, the use of this species to stabilize oxygen content in certain high temperature oxide ceramic superconducting layers was shown. "Delta Singlet Oxygen" in can also be used accurate "milling" of diamond-like carbon insulating layers by plasma etching as the reactive gas.

"Delta Singlet Oxygen" is formed in the following reaction:

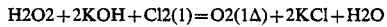

$H_2O_2 + 2KOH + Cl_2(1) = O_2(1\Delta) + 2KCl + H_2O$

In principle, any other hydroxide of the alkali metals (particularly NaOH, see Richardson et. al.) could be used as well, but at the high concentrations required to obtain an efficient "Delta Singlet Oxygen" production rate, potassium hydroxide has been determined to be most suitable, due to the lower viscosity of the solution and thus the ease of atomization.

In the prior art, the combination of hydrogen peroxide with potassium hydroxide in solution was used as the working medium in which chlorine gas was simply bubbled through. "Delta Singlet Oxygen" exudate was collected above this solution. This technique, often termed the "bubbler reactor", has had a number of major shortcomings.

The flow rate of chlorine is strongly limited, since too high a flow rate produces unreacted chlorine that can be deleterious (if not for Iodine/oxygen lasers, certainly for the purpose of depositing and etching superconducting electronic devices). Furthermore, excessive eruption of unreacted chlorine drastically disrupts the surface of the liquid and causes excessive interaction of the solution with the already created "Delta Singlet Oxygen". Obviously, this causes premature deactivation of the "Delta Singlet Oxygen".

In a typical bubbler, "Delta Singlet Oxygen" bubbles created near the interaction zone of the chlorine with the hydroxide and peroxide must travel to the top of the liquid. If the flow rate of the chlorine is very slow, then the bubbles are small and the surface area large. This results in deactivation due to contact with the liquid. If the bubbles are too large, the reaction rate is slow and some free chlorine will reach the surface. Decreasing the column of liquid above the bubbling source is not helpful either, since this action results in a decrease of the reaction path. Drip reaction on wet columns is also part of the prior art, and it's major shortcoming is low yield due to the small available surface area.

OBJECTS OF THE INVENTION

Thus, it is an object of the present invention to provide an improved method of generating.

It is a further object of this invention to provide a method of generation whereby the concentration of said "Delta Singlet Oxygen" species in the exudate (regular oxygen possibly with argon as a carrier) exceeds concentrations achieved in the prior art.

Still another object of the provide invention is to present an apparatus capable of generating said "Delta Singlet Oxygen" species in an efficient and continuous manner.

A final object is to provide an apparatus capable of generating said "Delta Singlet Oxygen" species which can be effectively used in any external process requiring metastable activated oxygen species for oxidation processes.

SUMMARY OF THE INVENTION

The new and improved continuous reactors for producing "Delta Singlet Oxygen" according to the invention can produce the delta singlet oxygen without a carrier or using argon carrier gas. Both designs cause solutions of hydrogen peroxide and potassium hydroxide to impinge as aerosols with gaseous chlorine so as to improve reaction rates, and production of, "Delta Singlet Oxygen" species. The mechanisms are designed to limit contact of the freshly produced delta singlet oxygen with the natal solutions and thus avoid deactivation of said species, and to make a pure gas flow of said "Delta Singlet Oxygen" species immediately available for usage thereof.

These reactors find application in three distinct areas, namely chemical Iodine/oxygen lasers, superconducting electronic device foundries, and chemical processes involving difficult oxidation processes.

This invention relates to methods of continuously generating "Delta Singlet Oxygen" gaseous species. The instant invention also relates to specially designed apparatus and methods of so generating said "Delta Singlet Oxygen" species which are useful in the preparation and deposition of oxide high temperature superconductors. The invention also relates to methods of generating said "Delta Singlet Oxygen" species at high concentrations so as to make them more amenable to subsequent use in contrast to the prior art.

Methods used for generating activated "Delta Singlet Oxygen" species have included a "bubbler" in which hydrogen peroxide, combined with potassium hydroxide (or often sodium hydroxide) in solution, was used as the working solution. Chlorine gas was bubbled in to form the activated "Delta Singlet Oxygen" species. However, this method has had many shortcomings, not least of which has been the inability to generate the high concentration (more than 50% of total oxygen flow)

required for most of the contemplated uses of the "Delta Singlet Oxygen".

I have found certain principles and developed certain apparatus to implement these principles resulting in designs that circumvent this difficulty.

The principle of my invention is to provide for a method of reaction between the fuel (the peroxide/hydroxide solution) and the chlorine gas that avoid excessive contact between the product of reaction (delta singlet oxygen) and the natal solution. When this principle is followed, deactivation of the metastable delta singlet oxygen by transfer of excess energy via multiple non-elastic collisions with the natal solution is avoided. As a result, the active species can decay to its ground state only through the emission of a photon (at about 1.27 microns), a process for which the half life time is about 40 minutes.

The improved design of the instant invention involves the formation of two mutually impinging aerosols, (one is the peroxide/hydroxide solution, while the other is the chlorine gas), in such a way as to optimize surface reactions taking place. The process has been designed to be continuous, with only intermittent replacement of the peroxide-hydroxide tank, and only when the reaction product (KCl) reaches too high a level.

In the practice of my invention, I prefer to use certain methods to generate the desired activated "Delta Singlet Oxygen" species. The following describes two actual embodiments of the instant invention.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
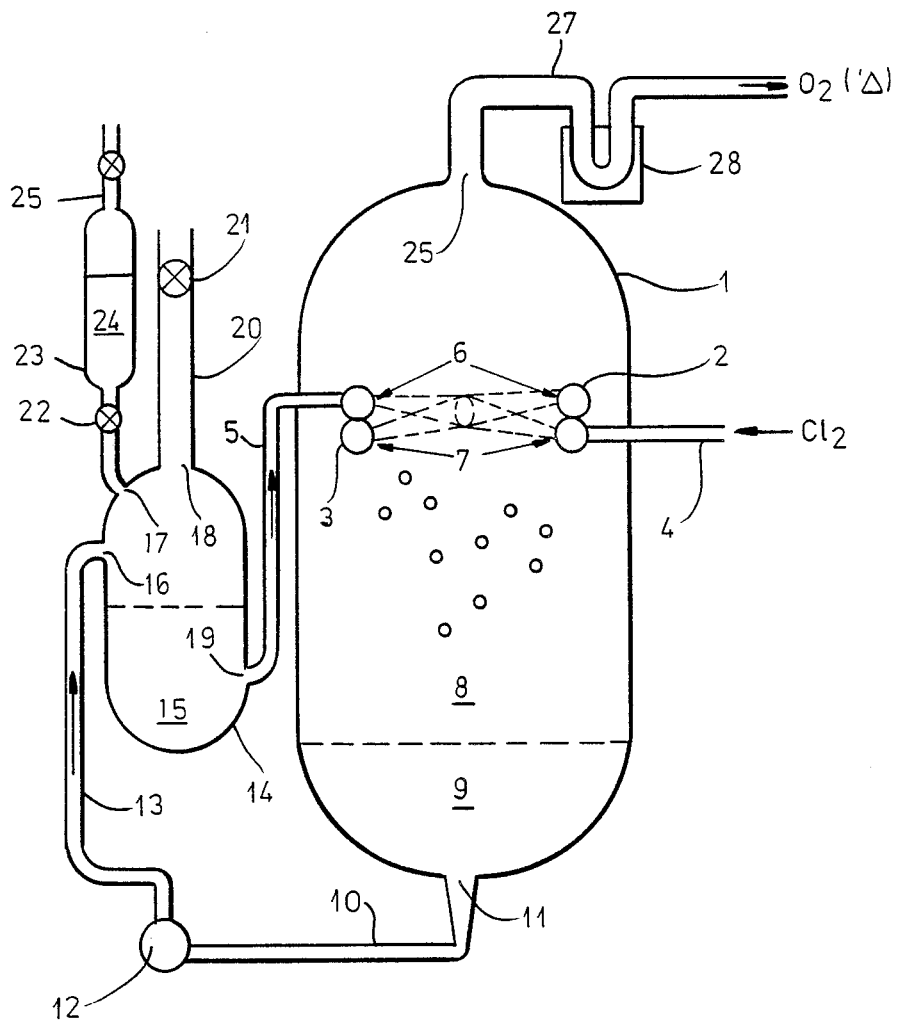
FIG. 1 is an elevational view in highly diagrammatic form of an apparatus for producing delta singlet oxygen according to the invention.
Figure 3:
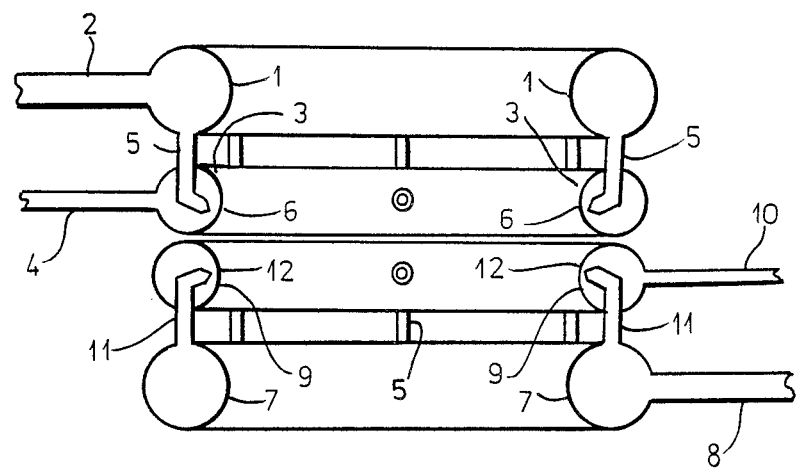
FIG. 3 is a diagrammatic section through the toroid nozzle assembly of FIG. 2.

The general elements of "Delta Singlet Oxygen" continuous reactor are shown in FIG. 1. In the reaction vessel 1, two hollow toroidal rings 2 and 3 are positioned close together. The lower toroid is supplied with chlorine gas through a feedthrough pipe 4, while the hydroxide/peroxide mixture is fed through a feedthrough pipe 5 to the upper toroid 2. The hydroxide/peroxide toroid 2 has a number of symmetrically positioned nozzles 6 pointing slightly downward on the inner rim of the toroid, while the chlorine toroid has the same number of nozzles 7, positioned each under the midpoint of two hydroxide/peroxide nozzles, and pointing slightly upward. It should be clear to those skilled in the art that the mutual position of the hydroxide/peroxide and chlorine nozzles could be changed, and the nozzles can be aligned with each other. I have determined that the former arrangement works best when the nozzle circumferential density is high, while the latter may be preferred when this said density is low.

In the operation of my new and improved invention, the two sprays interact in the center of the two toroids, forming the gaseous "Delta Singlet Oxygen" which escapes upward, while droplets 8 of the hydroxide-peroxide mixture containing KCl in solution 8 are allowed to drop to the bottom of the reactor 9. Since the reaction is always carried out with a specific chlorine deficiency (see below), the solution 9 will contain large amounts of unreacted hydroxide-peroxide. I have found it best to conduct this solution through a pipe 10 by an opening 11 at the bottom of the reaction vessel, to a recirculating pump 12 and an additional pipe 13 ending back in the "fuel" vessel 14.

At the bottom of the fuel vessel, a sufficient amount of hydroxide-peroxide solution 15 is always maintained. The vessel is equipped with three inlets and an outlet. Inlet 16 allows for entry of the recirculated fuel from the reaction vessel. Inlet 17 allows for intermittent refeed of a hydroxide-peroxide solution to the fuel vessel, so as to compensate for its consumption in the reaction vessel. Inlet 18 allows for pressurization of the fuel vessel with oxygen, while the outlet 19 connects the fuel vessel with the reaction vessel. Alternatively, the oxygen conduit 20 can have an optional extension (not shown in the figure) to the bottom of the fuel vessel. A needle valve 21 allows for controlling the oxygen pressure within the fuel vessel and also separates the fuel vessel from the pressurized oxygen source (not shown in the diagram).

A unidirectional variable pressure valve 22 separates the fuel reservoir 23 in which make-up fuel 24 is held from the fuel vessel 14. A pressurized feeding valve 25 allows for intermittent refeed of fuel to the fuel reservoir 23. There are also a number of monitoring devices not shown in the diagram. These include a pH meter in the fuel tank with an associated circuit which will automatically refeed the tank if the fuel pH drops below 9, a manometer controlling the pressure within the vessel, and a variety of temperature and pressure sensing devices assuring the safe operation of the reactor.

"Delta Singlet Oxygen" is collected from the reaction vessel 1 through an opening 26 at the top of reactor, leading through a pipe 27 to an optional cold trap 28 (dry ice or liquid nitrogen) 28, in order to remove excessive water vapors from the "Delta Singlet Oxygen" and any potential residual chlorine.

Figure 2:
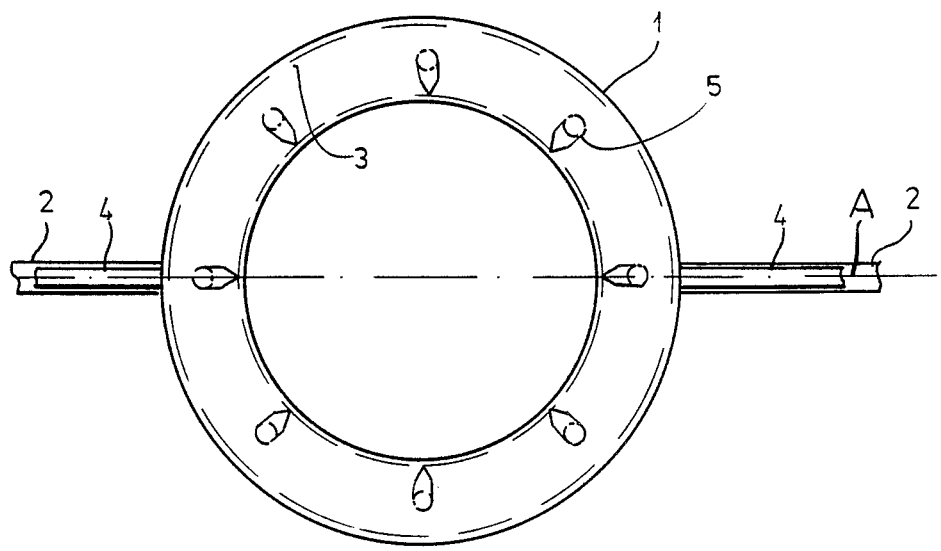
FIG. 2 is a plan view of the toroid assembly for use in a reactor generally similar to that of FIG. 1 at the reaction zone thereof but for an embodiment in which the aerosol and chlorine are entrained in argon as a carrier gas.

In yet another embodiment of my new invention, I have shown a different method for generating "Delta Singlet Oxygen". Referring now to FIG. 2, only the toroidal spraying mechanism is shown. There are a total of 4 toroids. The top and bottom toroids, 1 and 7, carry pressurized argon, while toroids 3 and 9 carry the hydroxide-peroxide fuel and chlorine respectively. 1 and 7 toroids are fed with pressurized argon through appropriate inlets 2 and 8 respectively. It should be obvious to those skilled in the art that the toroids (not only here but also in FIG. 1.) can and should be fed via appropriate manifolds distributed symmetrically around the outer circumference of the appropriate toroids, so as to make the pressure at the respective nozzles in each toroid more uniform.

The fuel and chlorine toroids are fed through appropriate piping, 4 and 10, respectively. Argon is fed through a multiplicity of inlets, 5 and 11, which are terminated with directional nozzles and positioned symmetrically on the toroids, each within the fuel and chlorine toroid respectively. The said nozzles point toward appropriate openings 6 and 12 in the fuel and chlorine toroids respectively. When argon gas is forced through the respective nozzles, it entrains the appropriate species and forms a spray of extremely small droplets from the fuel. I have determined that this imparts kinetic energy to the chlorine, thus allowing the chlorine gas injected to better penetrate into the fuel droplets. This results in a more efficient "Delta Singlet Oxygen" producing reaction. The average radius of the fuel particles decreases with increasing argon pressure, and the penetration range of the chlorine gas in the droplets increases as well.

I have established that the second system described herein does not require pressurization of the fuel as in the first (argonless) embodiment, thus making it a simpler system to implement. Furthermore, much higher conversion rates are possible due to the argon pressurization. It is well to note that the general structure of the second embodiment described herein is also depicted in FIG. 1, except that the toroid assembly thereof is replaced with that described in FIG. 2. Another modification as shown in FIG. 1 is that the fuel vessel is not pressurized and thus does not need to be modified accordingly.

In FIG. 1, the fuel vessel is shown as being positioned with its outlet below the position of the toroids. In practice, the fuel vessel in the argon pressurization embodiment of FIG. 2 must be positioned above the toroid assembly to allow for gravitational flow of the fuel to the toroid assembly (since no external oxygen pressure is applied to the fuel). It is still recommended, however, to keep an oxygen pressure which is at least atmospheric above the fuel, to limit loss of hydroxide.

It will be obvious to people familiar with the art that subtle variations of the proposed system are easily implemented. For instance, instead of using a toroid for the feed of the chlorine, a single nozzle positioned at an appropriate distance under the center of the fuel's toroid, spraying upward a conical spray of chlorine could achieve the same end.

It is often required that "Delta Singlet Oxygen" be carried by another inactive gas, FIG. 2, depicts indeed an embodiment of such a reactor with argon as the carrier gas. One should avoid in general the use of non-noble gases as carriers for "Delta Singlet Oxygen", since deactivation through molecular impingement with foreign molecules occur. From the noble gases, I prefer argon for its low price and appropriate molecular weight (40) between "Delta Singlet Oxygen" (32) and Chlorine (71), thus forming a natural blanket between chlorine and "Delta Singlet Oxygen" in the reactor.

EXAMPLES

EXAMPLE 1

The operation of the reactor is fairly simple. Fuel for the "Delta Singlet Oxygen" reactor is comprised of two solutions which are fed in equal parts simultaneously to the fuel reservoir 23. The solutions are specifically 85 wt. % to 95 wt. % H2O2, and 20 wt. % to 25 wt. % KOH in water.

To prepare such solutions, one weighs out typically 20 to 25 lbs. of KOH pellets and adds them slowly, with stirring, to 100 lbs. of water (about 12.0 gallons). The peroxide solution is acquired as such. Since the unused fuel is recycled, and thus usually contains some unreacted chlorine, the pH of the solution has a tendency to decline. It is preferable to hold the pH at 10, but a range of 9 to 10.5 can be allowed. This is achieved by refeeding fresh hydroxide to the solution via an appropriate feed controlled by an automated pH meter.

The process is started by establishing an appropriate steady state spray of the hydroxide/peroxide solutions through the set of nozzles 6. This is achieved by adjusting the oxygen pressure on the fuel vessel 14 with the needle valve 21. Oxygen was chosen as a pressurizing gas because it promotes the stability of the hydroxide in the fuel solution. When the fuel tank is not pressurized, then one must maintain a $CO_2$-free atmosphere above the caustic solution to prevent its deterioration with time. Once a steady state spray of the fuel is achieved, chlorine is introduced through the set nozzles 7. The chlorine flow rate is adjusted to be slightly lower than the expected stoichiometric reaction ought to require. This assures full consumption of all the chlorine, its conversion to KCl, and also enhances purity of the resulting "Delta Singlet Oxygen" as well. To assure such purity, one makes sure that the fuel spray completely blankets out the chlorine spray. The special geometrical arrangement of the two toroids and their nozzles have been designed to assure the desired result. In practice, I have found that I could not prevent minimal amounts of the chlorine to be entrained in the spent fuel without reaction, and thus closed cycle adjustment of the pH was found necessary.

EXAMPLE 2

The apparatus of FIG. 1 is used except that argon gas is used as the pressurizing gas to atomize and form small droplets of the reactants, thus using toroids as described in FIG. 2. Solutions are made up, as in Example 1, and put into the appropriate holding tanks. The required monitoring systems are set up and the several gas pressures are set for operation of the apparatus. During said operation, "Delta Singlet Oxygen" is created at the interface between the fuel droplets and the chlorine gas. Being lighter than the chlorine, "Delta Singlet Oxygen" rises to the outlet 26. The efficiency of the reaction is a strong function of the fuel droplets'size. The smaller the droplets, the higher the surface of the fuel droplets, and hence, the reaction rate. Since "Delta Singlet Oxygen" is allowed to move up without any significant interaction with the liquid phase, the excited state is conserved, thus yielding a high percentage of "Delta Singlet Oxygen" in the outgoing stream (80% "Delta Singlet Oxygen"/O2* should be achievable). It is well to note that droplet size is determined by the fuel nozzles' aperture and the pressure drop on the nozzles, or the oxygen pressure on the fuel vessel 14.

Since chlorine usage is deliberately kept much lower than that required for stoichiometry, the reaction's waste droplets 8 that accumulate on the bottom of the reaction vessel 9 contain valuable unreacted fuel. For this reason, I have provided the recirculating arrangements shown in the preferred design of this invention.

As the reaction proceeds, KCl is expected to build up in the fuel, and when this reaction product exceeds a critical amount (about once a day if the fuel vessel is large enough), the reactor is deactivated and the waste products removed. In some applications, it is important that the "Delta Singlet Oxygen" stream be relatively free of water vapor (a dewpoint of about-40° C.). For that purpose, the outgoing "Delta Singlet Oxygen" is passed through a cold trap which freezes out the water vapors that can be entrained from the reaction zone to the "Delta Singlet Oxygen" stream. The use of solid drying agents like drierite or diatomaceous earths is not recommended, since these will tend to deactivate the "Delta Singlet Oxygen"'s excited state (diatomaceous earths are particularly deleterious).

I claim:

1. A process for the continuous production of delta singlet oxygen, comprising the steps of:
   (a) continuously forming an aerosol of a mixture of hydrogen peroxide and an alkali-metal hydroxide;
   (b) continuously directing said aerosol and chlorine gas in opposite directions against each other into mutually impinging relationship in a gas-filled reaction zone in a reactor to react said mixture with said chlorine gas and produce said delta singlet oxygen;
   (c) providing a free gas-filled space directly above said zone in said reactor into which said delta singlet oxygen directly passes upwardly from said reaction zone, and removing said delta singlet oxygen from said reactor and said space without causing said delta singlet oxygen to pass through a body of liquid;
   (d) permitting droplets of reaction products other than delta singlet oxygen to freely fall downwardly in said vessel; and
   (e) controlling the proportions of said hydrogen peroxide alkali-metal hydroxide and chlorine gas at said zone so that said chlorine is in a stoichiometric deficiency for the reaction $$H_2O_2 + 2MeOH + Cl_2 = O_2^* + 2MeCl + H_2O,$$

where Me is alkali metal and $O_2^*$ is delta singlet oxygen.

2. The process defined in claim 1 wherein said alkali-metal hydroxide is potassium hydroxide.

3. The process defined in claim 2 wherein, in step (a), said aerosol is formed from a mixture of about equal parts of a solution of about 85% to 100% by weight of hydrogen peroxide and a solution of about 20% to 25% by weight potassium hydroxide.

4. The process defined in claim 1 wherein, in step (a), said aerosol is produced by entraining said mixture in an inert gas as a carrier gas.

5. The process defined in claim 1 wherein, in step (b), said chlorine gas is entrained in an inert gas carrier.

6. The process defined in claim 1 wherein, in step (b), said aerosol and chlorine gas are directed into mutually impinging relationship in said reaction zone by directing jets of said mixture and said chlorine gas against one another from respective nozzles arrayed along respective juxtaposed toroidal pipes.

7. The process defined in claim 1 wherein residual water vapor is condensed from the delta singlet oxygen removed from said space.

* * * * *